(12) United States Patent
Botte

(10) Patent No.: US 8,029,759 B2
(45) Date of Patent: Oct. 4, 2011

(54) PRETREATMENT METHOD FOR THE SYNTHESIS OF CARBON NANOTUBES AND CARBON NANOSTRUCTURES FROM COAL AND CARBON CHARS

(75) Inventor: Gerardine G. Botte, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 12/726,649

(22) Filed: Mar. 18, 2010

(65) Prior Publication Data

US 2010/0247420 A1 Sep. 30, 2010

Related U.S. Application Data

(60) Provisional application No. 61/163,991, filed on Mar. 27, 2009.

(51) Int. Cl.
*D01F 9/12* (2006.01)
(52) U.S. Cl. ............... 423/447.1; 423/447.2; 977/700; 977/742; 502/182
(58) Field of Classification Search ............... 423/447.1, 423/447.3, 445 B; 977/742, 842
See application file for complete search history.

(56) References Cited

U.S. PATENT DOCUMENTS

| | | | |
|---|---|---|---|
| 7,052,667 B2 * | 5/2006 | Loutfy et al. .............. | 423/447.1 |
| 7,192,567 B1 | 3/2007 | Reilly | |
| 7,485,211 B2 | 2/2009 | Botte et al. | |
| 2005/0098443 A1 | 5/2005 | Gomez | |
| 2006/0137487 A1 | 6/2006 | McKinnon et al. | |
| 2008/0083612 A1 | 4/2008 | Wang et al. | |
| 2009/0145750 A1 | 6/2009 | Botte | |

OTHER PUBLICATIONS

International Search Report and Written Opinion, mailed May 11, 2010.
X Jin, G G Botte, Feasibility of hydrogen production from coal electrolysis at intermediate temperatures, Journal of Power Sources 171 (2007) 826-834.
P Patil, Y De Abreu, and G G Botte, Electrooxidation of coal slurries on different electrode materials, Journal of Power Sources 158 (2006) 368-377.
Y De Abreu, P Patil, A I Marquez, G G Botte, Characterization of electrooxidized Pittsburgh No. 8 Coal, Fuel 86 (2007) 573-584.
Premium carbon products and organic chemicals from coal, Profiles, Oct. 2005, PF 05-05.

* cited by examiner

*Primary Examiner* — Stuart Hendrickson
*Assistant Examiner* — Richard M Rump
(74) *Attorney, Agent, or Firm* — Wood, Herron & Evans, LLP

(57) ABSTRACT

Carbon nanostructures such as multiwalled carbon nanotubes are formed from electrolyzed coal char. The electrolyzed coal char is formed by forming a slurry of coal particles, metal catalyst and water and subjecting this to electrolysis, which generates carbon dioxide and hydrogen. This forms a coating on the particles which includes metal catalysts. These particles can be used as is for formation of multi-walled carbon nanotubes using a pyrolysis method or other method without the addition of any catalyst. The gelatinous coating can be separated from the char and used as a fuel or as a carbon source to form carbon nanostructures.

11 Claims, 2 Drawing Sheets

PRETREATMENT METHOD FOR THE SYNTHESIS OF CARBON NANOTUBES AND CARBON NANOSTRUCTURES FROM COAL AND CARBON CHARS

RELATED APPLICATION

This application is related to and claims the benefit of U.S. Provisional Patent Application Ser. No. 61/163,991, filed Mar. 27, 2009, the disclosure of which is incorporated herein by reference.

BACKGROUND OF THE INVENTION

Nanostructures such as multi-walled carbon nanotubes have a wide variety of different applications due to their electrical conductivity and strength characteristics. These can be formed from a wide variety of different materials. One of the most basic materials used to form multiple-walled carbon nanotubes is coal. Carbon nanotubes in particular have been formed from coal using arc discharge, and CVD.

Carbon nanotube production is increased when metal catalysts are added to the arc discharge electrode, i.e., cobalt, iron, nickel, yttrium, lanthanum, gaddinium, and boron. Since nanotube synthesis takes place at higher temperatures, a complete decomposition of the catalytic precursor is expected which acts as a nucleation agent to enhance growth of the carbon nanotubes.

Coal has certain disadvantages in the formation of multiple-walled carbon nanotubes. Typically, in order to produce carbon nanotubes from coal it is necessary to produce coal rods in which the catalysts are in the rod. It is also necessary to operate the system at relatively high temperatures, above 2000° C. Furthermore, coal (bituminous and sub-bituminous) still contains hydrogen which, if extracted from the coal before the production of the nanostructure, will provide an economic benefit. In addition, expensive catalysts must be added to the coal mixture in order to allow the formation of the carbon nanotubes.

SUMMARY OF THE INVENTION

The present invention is premised on the realization that carbon nanostructures such as multiple-walled carbon nanotubes can be produced using a coal byproduct. More particularly, the present invention is premised on the realization that char, which is the byproduct of electrolysis of an aqueous coal slurry, can be used to form multi-walled carbon nanostructures that do not present the same issues as when coal is used as a carbon source.

More particularly, ground coal can be subjected to electrolysis which will consume a portion of the coal, forming particles that are coated with a gelatinous organometallic material which prevents further electrolysis. These coated particles can be subjected to solvent extraction to remove the organic material, allowing the coal particle to be used again for electrolysis. This can be repeated until cleaning or solvent extraction of the coating no longer improves the efficacy of the coal particle in electrolysis.

The coated coal particles can be used as a carbon source material to form carbon nanostructures. This process does not require the addition of expensive organometallic salts as the active catalyst is generated on the surface of the coal particle during electrolysis. Further, the particles do not require activation and do not have to be formed into rods. Lower temperatures also can be employed.

This method can be used with a wide variety of different coals, and, further, the char can be collected from the electrolysis process at any time, either after an initial electrolysis or after repeated electrolysis, depending on the end use requirements.

The objects and advantages of the present invention will be further appreciated in light of the following detailed description and examples in which:

BRIEF DESCRIPTION OF THE DRAWING

FIG. 3 is a schematic diagram of the method of forming char for use in the present invention.

DETAILED DESCRIPTION

Figure 1:
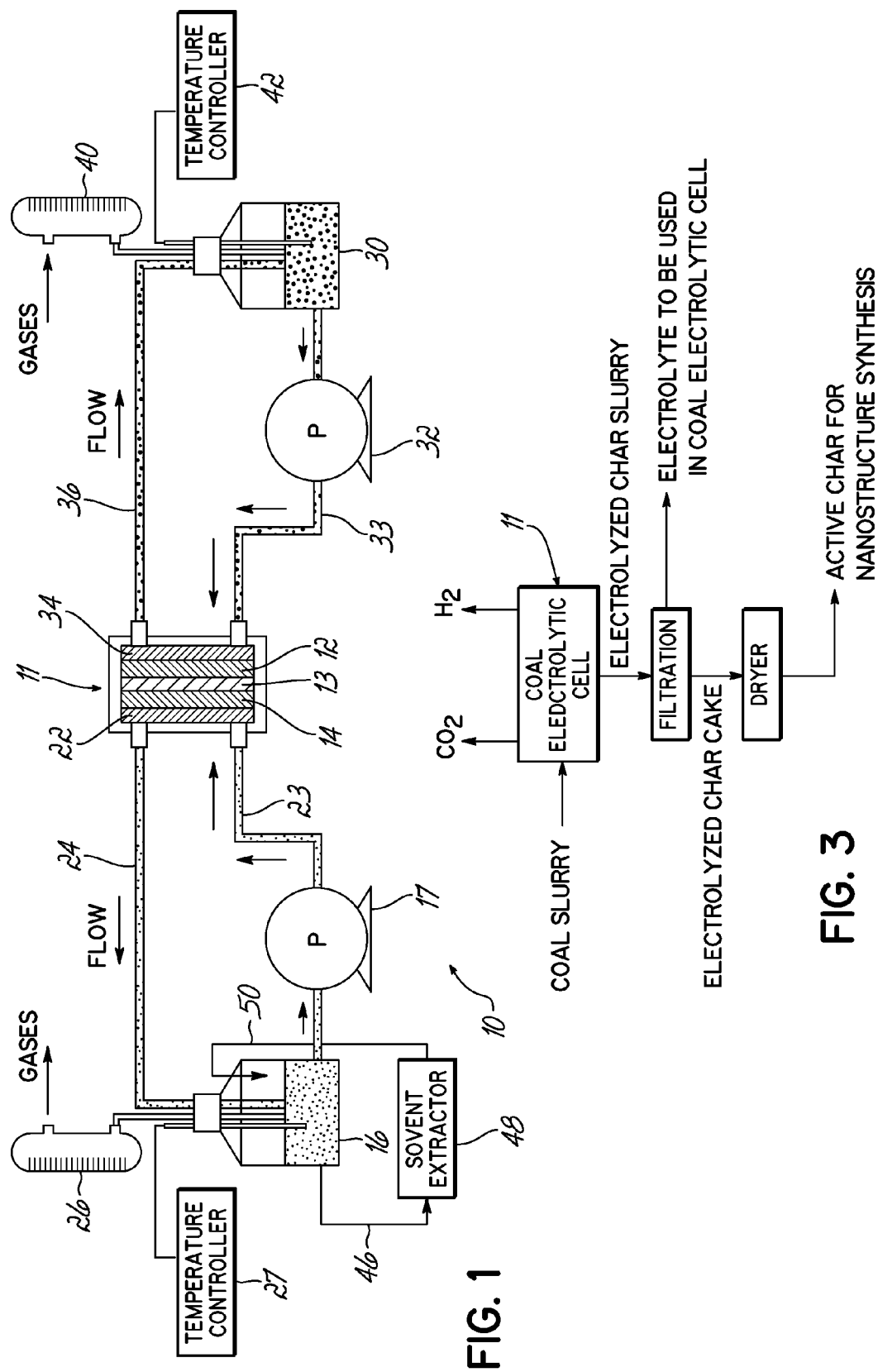
FIG. 1 is a diagrammatic depiction of an electrolytic apparatus to form hydrogen from coal slurries.

FIG. 1 shows a diagrammatic depiction of an apparatus 10 used to electrolyze coal which, in turn, produces char for the manufacture of carbon nanotubes. As shown in FIG. 1, the apparatus 10 includes an electrolytic cell 11, which incorporates a cathode 12 and an anode 14 separated by a membrane 13, such as a Nafion membrane or polyethylene membrane.

A reservoir 16, which contains the anode solution, leads to a pump 17 which pumps the anode solution into the anodic side of the electrolytic cell 11. As shown, the anode solution flows through line 23 through the channels 21 in an acrylic block 22. The anode fluid passes through the channels 21 and returns via line 24 to the reservoir 16. The generated gas, carbon dioxide, in the fluid is emitted from the reservoir to a gas collector 26. A temperature controller 27 is located in reservoir 16.

At the opposite side, reservoir 30 includes the cathode solution, which is directed to pump 32 leading to the cathode side of electrolytic cell 11. Again, this cathode passes through line 33 through channels (not shown) in the acrylic block 34, which provide contact with the cathode 12, and the fluid then is directed from the channels through line 36 back to reservoir 30. The generated gas, hydrogen, is directed to the gas collector 40. Again, a temperature controller 42 is located in reservoir 30.

Figure 2:
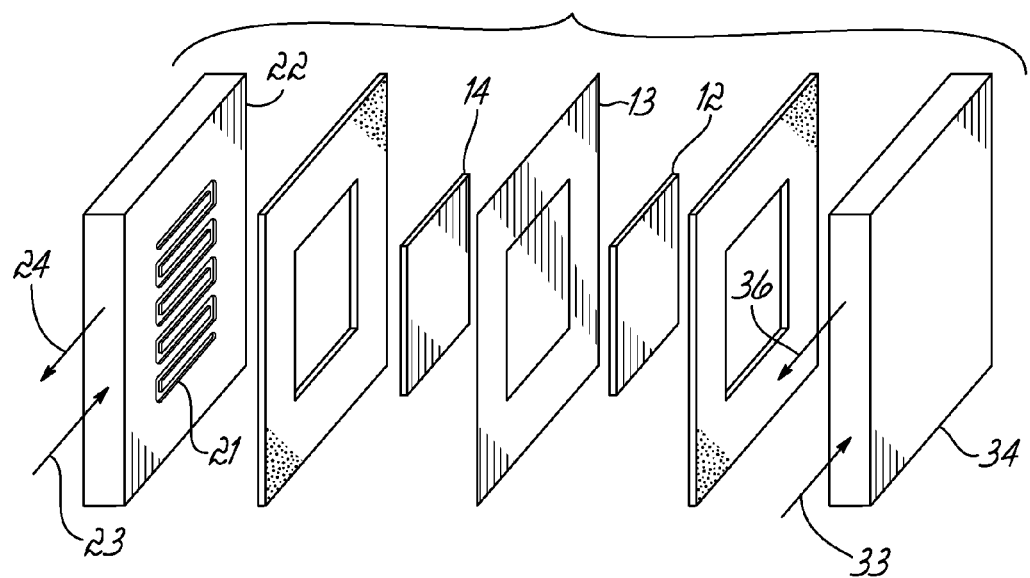
FIG. 2 is an exploded diagrammatic view of the electrolytic cell of FIG. 1.

FIG. 2 shows an exploded view of the electrolytic cell 11. Acrylic blocks 22 and 34 are mirror images of each other. The anode 14 and cathode 12 are on either side of the separator 13. Spacing is established between the acrylic blocks 22 and 34, the cathode 12, and anode 14 by inert separators 46 and 48. These can be, for example, polytetrafluoroethylene, Nafion or polyethylene.

The cathode 12 can be any material which will withstand the acidic conditions in the electrolytic cell. Generally, these can include carbon, nickel, noble metals such as platinum, iridium, rhodium, and combinations thereof.

Although the anode can be any conductor, the anode typically comprises a noble metal-containing electro-catalyst electroplated, i.e., deposited, on a substrate or support. The electro-catalysts may be single metal, bi- or trimetallic, and comprise at least one noble metal and one or more other metals that are active to coal electrolysis. The other metals may be, but are not necessarily noble metals. In some embodiments, the electrocatalyst may comprise a single noble metal on a support. The support may be chosen from many known supports. Some suitable supports include noble metal meshes and foils, such as platinum mesh, platinum foil, titanium mesh, hastelloy mish, gold mesh, gold foil, tantalum mesh, tantalum foil, as well as platinum or iridium sponges. When mesh is used as the substrate, the mesh size will be chosen such that it can be properly electroplated with the electro-catalyst, whether it is a bi- or trimetallic catalyst electroplated on the substrate, or a bi- or trimetallic/Raney metal catalyst electro-deposited on the substrate. Aside from the specific substrates listed, other suitable supports will be recognized by those of ordinary skill in the art. In some embodiments, the electrode is a bi- or tri-metallic electro-catalyst electroplated directly on a support.

Suitable metals for bi- and trimetallic catalysts are selected from platinum, iridium, ruthenium, rhenium, palladium, gold, silver, nickel, and iron. By way of example, in one embodiment, the electrode is a platinum-iridium electro-catalyst electrodeposited on platinum mesh.

The electrolysis of coal is further described in Published Application US2009/0145750, the disclosure of which is incorporated herein by reference.

To form char for the synthesis of carbon nanostructures, coal and/or carbon slurry is prepared by grinding coal to a particle size between 1 µm to 250 µm. The pulverized coal is mixed with an electrolyte containing: a proton carrier (e.g., $H_2SO_4$, $H_3PO_4$, etc) and a catalytic salt (iron salt, cerium salt). Typically, iron is required for an efficient reaction. The concentration of iron can be up to 10,000 ppm. The current density which can be applied in the electrolytic process can be from 30 mA/cm$^2$ up to 200 mA/cm$^2$. The coal slurry is introduced into the coal electrolytic cell as the anode solution. During the electrolysis, dehydrogenation of the coal takes place, producing pure hydrogen at the cathodic compartment of the electrolytic cell. Coal is oxidized to carbon dioxide (which is collected at the anodic compartment of the electrolytic cell) and large hydrocarbon structures, which coat the coal particles. After electrolysis, the electrolyzed char slurry is filtered to separate the electrolyte from the solids. The electrolyte and catalytic salts can be reused in the coal electrolytic cell. The solids are sent to a drier to remove water from the char. The dried char can be used to form carbon nanostructures using known methods: spray pyrolysis, thermal chemical vapor deposition, and plasma enhanced chemical vapor deposition.

The mechanism by which coal is electrolyzed includes six steps, which are described below.

a. Step I: Fe (III) ions in solution are adsorbed on the surface of a coal particle.
b. Step II: The adsorbed (C—Fe(III)$_{ads}$ structure flows towards the surface of the electrode due to forced flow.
c. Step III: It is hypothesized that when the (C—Fe(III)$_{ads}$ structure is in contact with the anode electrode, Fe(III)$_{ads}$ on the coal acts as a bridge between the coal and the electrode.
d. Step IV: It is possible that due to steric effects and/or electrostatic charges, Fe (III) will get de-adsorbed from the coal particle to the anode electrode, and then the oxidation of coal takes place, simultaneously reducing Fe (III) to Fe (II). During the process coal can be oxidized to $CO_2$ and/or other large chain hydrocarbons.
e. Step V: The Fe (II) ions can be oxidized at the anode of the electrolytic cell to regenerate Fe (III) ions.
f. Step VI: As coal oxidizes, gelatinous films grow on the surface of the coal particle preventing the oxidation of coal as reported in the literature. It is hypothesized that the films may prevent the adsorption of Fe (III) ions into the surface of the coal particle (bouncing back to the solution as shown in FIG. 11). Another possibility is that the films and adsorbed Fe (III) ions form complex stable structures that prevent the oxidation of coal.

Thus, in the process of the present invention, the coal slurry is passed through the apparatus 10 shown in FIG. 2 and repeatedly circulated back to the reservoir 16 and through the electrolytic cell 11. Eventually, the particles of coal become coated with the gelatinous material, which prevents their further use in electrolysis. These particles can be then directed via line 46 to a solvent extractor 48 which contacts the coal particles with an organic solvent such as ethanol, pyridine, or acetone.

The solvent at elevated temperatures, if necessary, is separated from the electrolyte and contacted with the coal particles to remove the gelatinous coating. The solvent is separated from the particles by filtration and the particles can then be introduced back into the anode solution through line 50 and electrolyzed further. This can be repeated until the coal particles are no longer electrolyzed. In other words, the production of hydrogen is significantly reduced. At this point the char particles coated with the gelatinous coating can be used in the formation of carbon nanotubes.

The solvent from extractor 48 with the dissolved gelatinous material can be recovered and used for the fuel as a dispersant for the char or in the formation of carbon nanotubes without the char.

As shown in FIG. 2, the electrolyzed char particles can be used after an initial electrolysis or if the gelatinous material is removed after repeated electrolysis. Once it is determined that the char should be used for formation of carbon nanotubes, it is filtered to separate the electrolyte, which can then be reused. The particles with the gelatinous coating are then dried.

The dried char particles are dispersed in an organic fluid to facilitate formation of the carbon nanotubes. Generally, liquid alcohols, alkenes, and ketones are suitable for use as a carrier, as well as the solvent from extractor 48. The particles are added to the carrier and sonified to thoroughly disperse the particles within the carrier.

Because the gelatinous coating includes the metal catalyst utilized in the electrolysis of the coal particles, a separate organometallic catalyst is not required for the formation of the carbon nanotubes.

The char particles can be formed into carbon nanotubes using any of the well known methods to form carbon nanotubes such as spray pyrolysis, thermal chemical vapor deposition, and plasma enhanced chemical vapor deposition.

Figure 4:
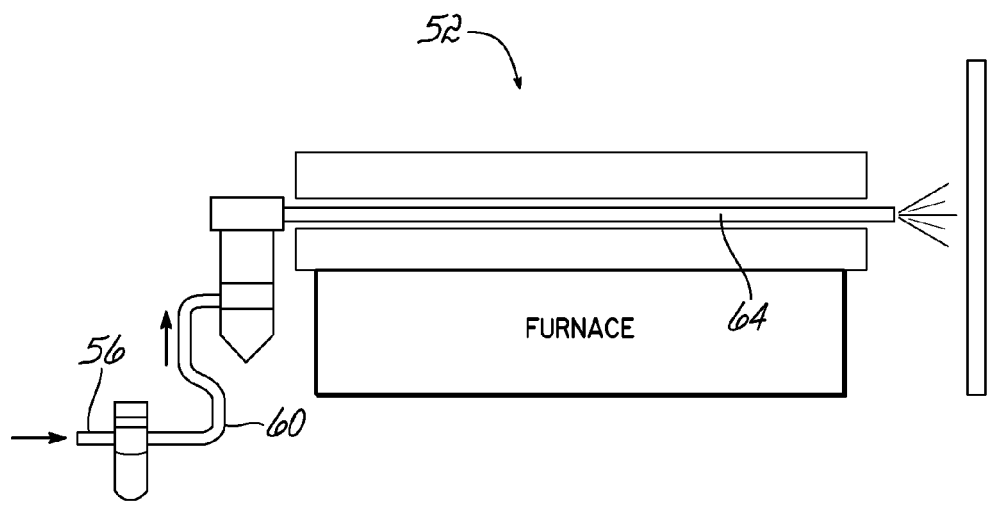
FIG. 4 is a diagrammatic view of a spray pyrolysis apparatus.

The apparatus 52 shown in FIG. 4 can be used to form nanotubes using spray pyrolysis. In this apparatus a carrier gas is introduced through line 56. A peristaltic pump directs the combination of the char and carrier into line 60, which directs it to a spray apparatus 62 which forces the char and a carrier gas such as argon or a $H_2/N_2$ mixture through a vycor tube 64 located in a furnace 68. The char carrier gas mixture flows through the furnace onto a substrate 70, forming the carbon nanotubes. The furnace establishes a reaction temperature of about 800° C. to about 900° C., or higher. Thermal shock will initiate the formation of nanostructures. When $H_2$ is used as a carrier gas, it can be obtained from the coal electrolysis.

The present invention will be further appreciated in light of the following detailed examples.

EXAMPLE 1

Synthesis of Carbon Nanotubes with Raw Coal

This example demonstrates that efficient synthesis of carbon nanotubes using raw coal cannot be achieved. Wyodak coal was used for the synthesis. Wyodak coal was ground by ball milling to a particle size between 44-215 μm.

Sample preparation for synthesis: 5.8 mg ground coal was added in 6 ml isopropanol, sonicated 5 minutes, and then diluted 20 times. A Si wafer was cleaned with acetone and D-water. After drying, 100 ul diluted coal dispersion was dropped (sprayed) on the Si wafer. After drying, the wafer was placed in the center of a Quartz tube oven.

The system was purged with 600 sccm Ar for 20 minutes and then heated to 900° C. over a period of 30 minutes under an argon atmosphere. The reactor was maintained at 900° C. with carrier argon gas at 600 sccm for 30 minutes. The reactor was then cooled to room temperature, again under argon gas at 600 sccm. The sample was analyzed using atomic force microscopy. Growth of carbon nanotubes was not observed.

EXAMPLE 2

Synthesis of Carbon Nanotubes with Raw Coal

This example demonstrates that efficient synthesis of carbon nanotubes using raw coal cannot be achieved. Wyodak coal was used for the synthesis. Wyodak coal was ground by ball milling to a particle size between 44-215 μm.

Sample preparation for synthesis: 5.8 mg coal was added in 6 ml isopropanol, sonicated 5 min, and then diluted 20 times. A Si wafer was cleaned with acetone and D-water. After drying, 100 ul diluted coal dispersion was dropped on the Si wafer. After drying, the wafer was placed in the center of a Quartz tube oven.

The system was initially purged with argon at 1000 sccm for 15 minutes while the temperature was raised from room temperature to 400° C. It was then purged with a 1:9 volumetric ratio of hydrogen to nitrogen flowing at 800 sccm for 20 minutes. The temperature was then raised over a period of 10 minutes to 800° C. under an argon atmosphere 1000 sccm argon. The 800 sccm hydrogen and nitrogen (ratio of hydrogen and nitrogen of 1:9) was passed through the reactor for 20 minutes. The reactor was then cooled to room temperature, again under flowing argon 1000 sccm. The sample was analyzed using atomic force microscopy. Minimal growth of carbon nanotubes was observed, presumably due to the presence of hydrogen.

EXAMPLE 3

Synthesis of Carbon Nanotubes with Electrolyzed Carbon Char

This example demonstrates that synthesis of carbon nanotubes using char after electrolysis is achieved. Wyodak coal was used for the synthesis. Wyodak coal was ground using ball milling to a particle size between 44-215 μm.

Electrolysis conditions: temperature: 80° C.; constant current: 96 mA; cut-off voltage: 1.17 V; electrolysis time: 12 hours; $Fe^{2+}/Fe^{3+}$ concentrations in the slurry: 40 mM/40 mM; electrolyte concentration in the slurry $H_2SO_4$: 4M.

Filtration: the coal slurry after electrolysis was filtered using vacuum filtration and a glassy carbon filter. The electrolyzed char cake was dried in an oven.

Drying conditions: the char cake was dried in an oven operating at 80° C. for six hours to remove the water from the char.

Sample preparation for synthesis: 5.8 mg of the active char after electrolysis was added in 6 ml isopropanol, sonicated 5 min, and then diluted 20 times. A Si wafer was cleaned with acetone and D-water. After drying, 100 ul diluted coal dispersion was placed on the Si wafer. After drying, the wafer was placed in the center of a Quartz tube oven.

The same conditions used in Example 1 were used to grow carbon nanotubes. The results were analyzed using atomic force microscopy and growth of carbon nanotubes was observed.

EXAMPLE 4

Synthesis of Carbon Nanotubes with Electrolyzed Carbon Char

This example demonstrates that synthesis of carbon nanotubes using char after electrolysis is achieved. Wyodak coal was used for the synthesis. Wyodak coal was ground by ball milling to a particle size between 44-215 μm.

Electrolysis conditions: temperature: 80° C.; constant current: 96 mA; cut-off voltage: 1.17 V; electrolysis time: 12 hours; $Fe^{2+}/Fe^{3+}$ concentrations in the slurry: 40 mM/40 mM; electrolyte concentration in the slurry $H_2SO_4$: 4M.

Filtration: the coal slurry after electrolysis was filtered using vacuum filtration and a glassy carbon filter. The electrolyzed char cake was dried in an oven.

Drying conditions: the char cake was dried in an oven operating at 80° C. for six hours to remove the water from the char.

Sample preparation for synthesis: 5.8 mg of the active char after electrolysis was added in 6 ml isopropanol, sonicated 5 minutes, and then diluted 20 times. A Si wafer was cleaned with acetone and D-water. After drying, 100 ul diluted char dispersion was deposited on the Si wafer. After drying, the wafer was placed in the center of a Quartz tube oven.

The reaction conditions from Example 2 were followed in this example. The sample was analyzed using Atomic Force Microscopy. AFM height image shows the morphology of the carbon nanotubes. Significantly greater amount of carbon nanotubes was obtained when compared to the synthesis of carbon nanotubes from raw coal in a $H_2/N_2$ atmosphere in Example 2.

An added advantage of the present invention is the recovery of the gelatinous coating material from extractor 48. This material includes the electrolyzing catalyst (such as iron) along with a complex organic matrix. This can be used as a fuel.

The dissolved gelatinous material also can be used as a vehicle to carry the char particles into the reactor to form nanotubes. This would be used in place of or in addition to the organic liquid carrier.

Optionally, the dissolved gelatinous material can be used by itself as the carbon source to form carbon nanotubes. In this application, the dissolved gelatinous material would replace the electrolytic char.

This has been a description of the present invention along with the preferred method of practicing the present invention. However, the invention itself should only be defined by the appended claims,

What is claimed is:
1. A method of forming carbon nanotubes comprising subjecting an electrolyzed coal char to an elevated temperature in a controlled environment said temperature and said environment effective to form carbon nanotubes from said char.
2. The method claimed in claim 1 wherein said char is coated with a gelatinous coating produced during an electrolysis process.

3. The method claimed in claim 1 wherein said electrolyzed coal char is formed by forming an aqueous slurry of ground coal and a metal catalyst and electrolyzing said slurry of ground coal.

4. The method claimed in claim 3 further comprising removing a gelatinous coating from said char and subjecting said char to a second electrolysis.

5. The method claimed in claim 3 wherein said metal catalyst is iron.

6. The method claimed in claim 1 wherein said char is dispersed in an organic liquid carrier.

7. The method claimed in claim 1 wherein said nanotubes are formed by chemical vapor deposition.

8. The method claimed in claim 1 wherein said nanotubes are formed by spray pyrolysis.

9. The method claimed in claim 8 wherein said char particles are in a carrier gas selected from the group consisting of argon, nitrogen, hydrogen and blends thereof.

10. The method claimed in claim 9 wherein said temperature is at least about 800°C.

11. A method of forming carbon nanostructures comprising subjecting a gelatinous material derived from electrolysized coal char to elevated temperature in a controlled environment to form carbon nanostructures.

* * * * *